United States Patent
Haverinen-Nielsen et al.

(10) Patent No.: US 12,481,275 B2
(45) Date of Patent: Nov. 25, 2025

(54) CONTROLLER

(71) Applicant: KEMIRA OYJ, Helsinki (FI)

(72) Inventors: Torsten Haverinen-Nielsen, Espoo (FI); Marjatta Piironen, Espoo (FI); Iiris Joensuu, Espoo (FI); Vesa-Matti Tikkala, Espoo (FI)

(73) Assignee: KEMIRA OYJ, Helsinki (FI)

( * ) Notice: Subject to any disclaimer, the term of this patent is extended or adjusted under 35 U.S.C. 154(b) by 726 days.

(21) Appl. No.: 17/769,046

(22) PCT Filed: Oct. 13, 2020

(86) PCT No.: PCT/FI2020/050675
§ 371 (c)(1),
(2) Date: Apr. 14, 2022

(87) PCT Pub. No.: WO2021/074489
PCT Pub. Date: Apr. 22, 2021

(65) Prior Publication Data
US 2024/0103503 A1  Mar. 28, 2024

(30) Foreign Application Priority Data
Oct. 16, 2019 (FI) ...................................... 20195891

(51) Int. Cl.
G05B 19/418 (2006.01)

(52) U.S. Cl.
CPC .............................. *G05B 19/41885* (2013.01)

(58) Field of Classification Search
CPC .......... G05B 19/41885; G05B 13/0265; G05B 13/042; G05B 11/011; G06N 3/084; G06N 7/06; G06N 5/045; G06N 20/00
See application file for complete search history.

(56) References Cited

U.S. PATENT DOCUMENTS

| | | |
|---|---|---|
| 6,792,336 B1 | 9/2004 | Johnson et al. |
| 2003/0055798 A1* | 3/2003 | Hittle .................. G05B 13/027 706/15 |

(Continued)

FOREIGN PATENT DOCUMENTS

| | | | |
|---|---|---|---|
| CN | 108415259 A | * | 8/2018 |
| GB | 2564863 A | | 1/2019 |

OTHER PUBLICATIONS

Madhikermi et al. Explainable Artificial Intelligence Based Heat Recycler Fault Detection in Air Handling Unit; Sep. 11, 2019; Lecture Notes in Computer Science, vol. 11763; pp. 1-21, Year 2019 (Year: 2019).*

(Continued)

*Primary Examiner* — Chad G Erdman
(74) *Attorney, Agent, or Firm* — Meunier Carlin & Curfman LLC

(57) ABSTRACT

The invention provides a control arrangement where the controller is arranged to drive the actuator utilizing automatically the explanation values. The control arrangement has a controller, which is arranged to drive an actuator. The control arrangement comprises also a setpoint controller, which is arranged to utilize deviations between explanation values of machine learning and normal explanation values of machine learning. The setpoint controller forms a setpoint value for the controller.

12 Claims, 5 Drawing Sheets

(56) References Cited

U.S. PATENT DOCUMENTS

| | | | |
|---|---|---|---|
| 2006/0085090 A1* | 4/2006 | Laitinen-Vellonen | ........................ G05B 23/024 700/128 |
| 2008/0274240 A1 | 11/2008 | Germouni et al. | |
| 2018/0335758 A1* | 11/2018 | Shinoda | ................. G06N 20/00 |
| 2021/0042613 A1* | 2/2021 | Öztireli | ................. G06N 5/045 |

OTHER PUBLICATIONS

International Search Report and Written Opinion mailed Dec. 22, 2020, from International Application No. PCT/FI2020/050675, 17 pages.
Finnish Search Report dated May 7, 2020, issued in FI Application No. 20195891, 1 page.
Madhikermi, Manik et al.,"Explainable Artificial Intelligence Based Heat Recycler Fault Detection in Air Handling Unit", Sep. 11, 2019, Advances in Databases and Information Systems, Springer International Publishing, CHAM, pp. 110-125.

* cited by examiner

CONTROLLER

CROSS REFERENCE TO RELATED APPLICATIONS

This application is a United States National Phase Patent Application of International Patent Application Number PCT/FI2020/050675, filed on Oct. 13, 2020, which claims the benefit of priority to Finnish Application No. 20195891, filed on Oct. 16, 2019, both of which are incorporated by reference herein in their entirety.

FIELD OF TECHNOLOGY

The invention relates to a controller, which can be used, for example, to control a water treatment device, a paper machine etc.

PRIOR ART

Nowadays machine learning algorithms are used with controllers in order that a controller would be set more easily than previously. Machine learning provides systems the ability to automatically learn and also to improve from experience without being explicitly programmed. So, machine learning (ML) utilities algorithms and statistical models that computer systems use to perform a specific task or tasks without using explicit instructions. There exist several ML algorithms. Here, only some of them are mentioned: linear regression, logistic regression, K-means, feed-forward neural networks etc.

Machine learning algorithms are used, for example, for analyzing multivariable measurements like a papermaking process. Because it is difficult to interpret how ML algorithms have arrived at a prediction, interpretation values are used to help users to evaluate how much each input parameter contributes to the predicted outcome of a ML algorithm. So, the explanations values are used for explaining how a ML algorithm have come to a specific result, and also for classifying how a process works. The explanation values are obtained by using, for example, SHAP (Shapley additive explanations) values, LIME method or DeepLIFT method.

Figure 1:
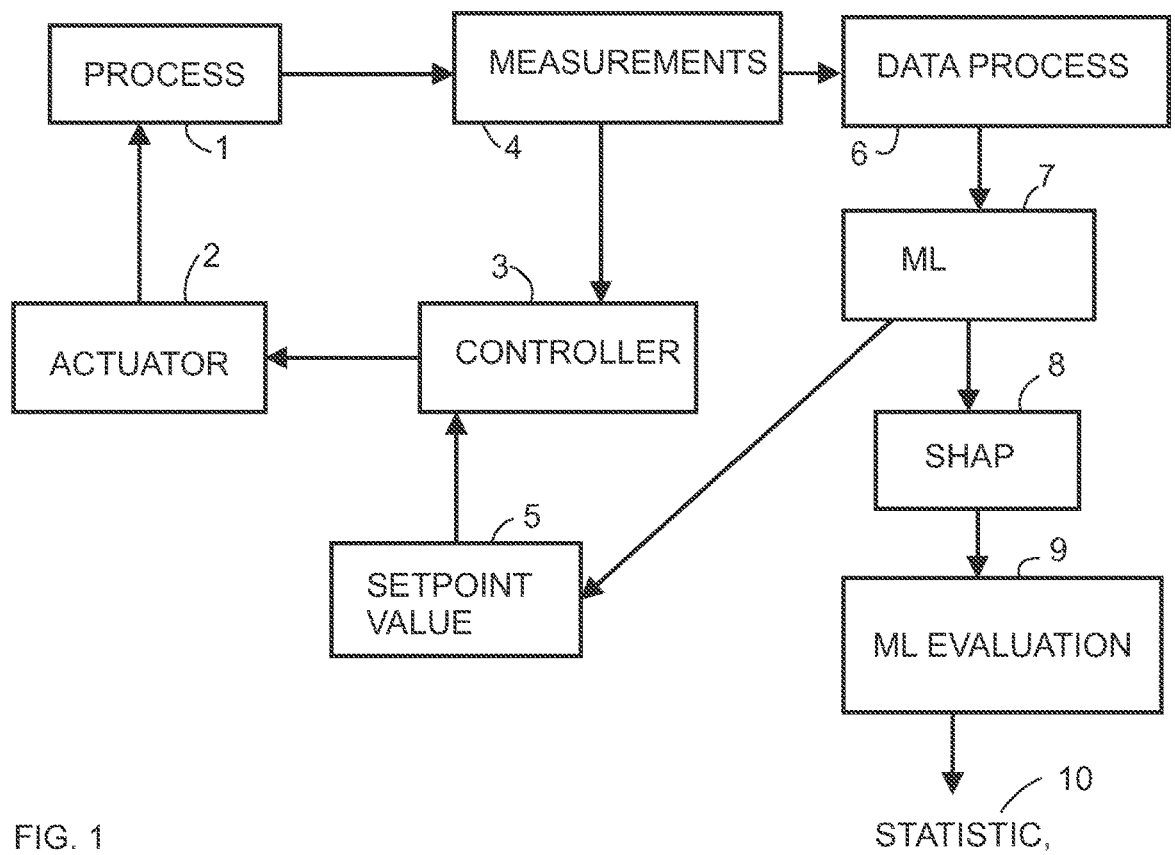

FIG. 1 shows an example of a known control arrangement, where a process 1 is driven by an actuator 2, which is controlled by a controller 3. Measurements 4 are taken from the process and they are used as feedback data for controller. The controller 3 compares the measurements with a setpoint value or values 5 and forms a control command/s for the actuator.

The measurements 4 can also be used for other purposes in which case it is convenient that the measurement data are pre-processed 6 before it is actually used. The pre-processing may, for example, comprise data merging, aligning time format, modifying metadata, data validation etc. In the example of FIG. 1 machine learning (ML) 7 is used for extracting information and patterns in large datasets. The machine learning algorithms are usually based on statistical models, which a computer can use to perform a certain task without having exact instructions but relies instead on recognizing patterns. The recognized patterns can be obtained by building a mathematical model based on a training dataset. Predictions (simulations) and pattern recognition can be made by feeding new data to the mathematical model. The output of the ML algorithm may be used as an input information to change the setpoint to the controller 3 in the form of a soft sensor value (prediction of a process value).

Because it is hard to see what is going on in the process from the output (predictions/simulations) of ML, the explanation values 8, like SHAP values in the embodiment of FIG. 1, are used to track how ML predictions link back to the input variables. For each prediction a rating number is calculated for each input variable indicating how the variable is contributing to the final predictions. These rating numbers can be seen as explanation values indicating the significance of an input value at a given point in time.

The explanation values are uses to validate how the ML algorithms and the ML models work 9. This can be done more easily from the explanation values than from the ML predictions. So, the ML models can be changed if they do not work properly. The explanation values can also be used, for example, to update statistical data 10.

Although, the explanation values are currently used for helping to analyze systems, like systems having multivariable measurements, there is no automatic way to utilize them when controlling the actuator/s.

SHORT DESCRIPTION

The object of the invention is to provide a control arrangement where the controller is arranged to drive the actuator utilizing automatically the explanation values. The object is achieved in a way described in the independent claim. Dependent claims illustrate different embodiments of the invention.

A control arrangement according to the invention has a controller, which is arranged to drive an actuator. The control arrangement comprises also a setpoint controller, which is arranged to utilize deviations between explanation values of machine learning and normal explanation values of machine learning. The setpoint controller forms a setpoint value for the controller. The explanation values of machine learning and normal explanation values of machine learning are, for example, SHAP values, values from a LIME method, values from a DeepLIFT method, or any other possible explanation values.

LIST OF FIGURES

Figure 2:
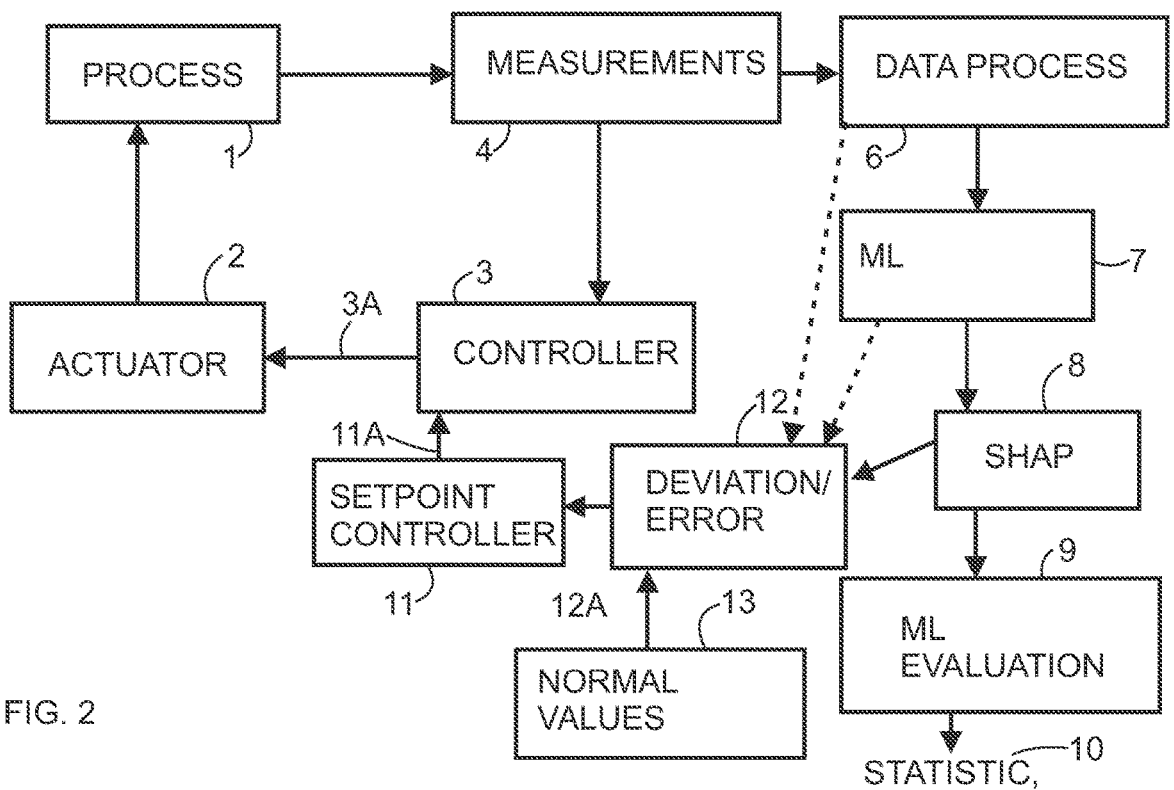
Figure 3:
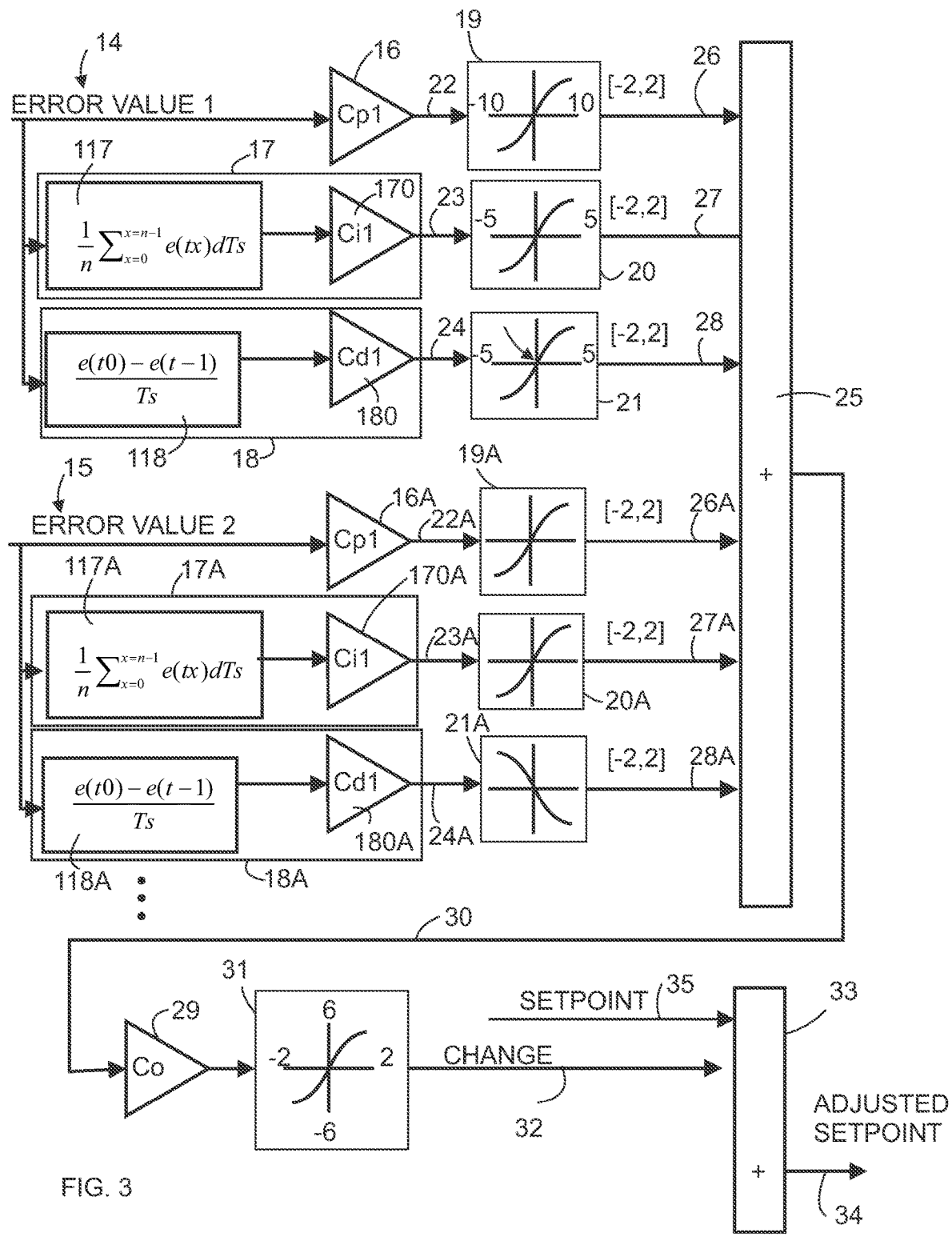
Figure 4:
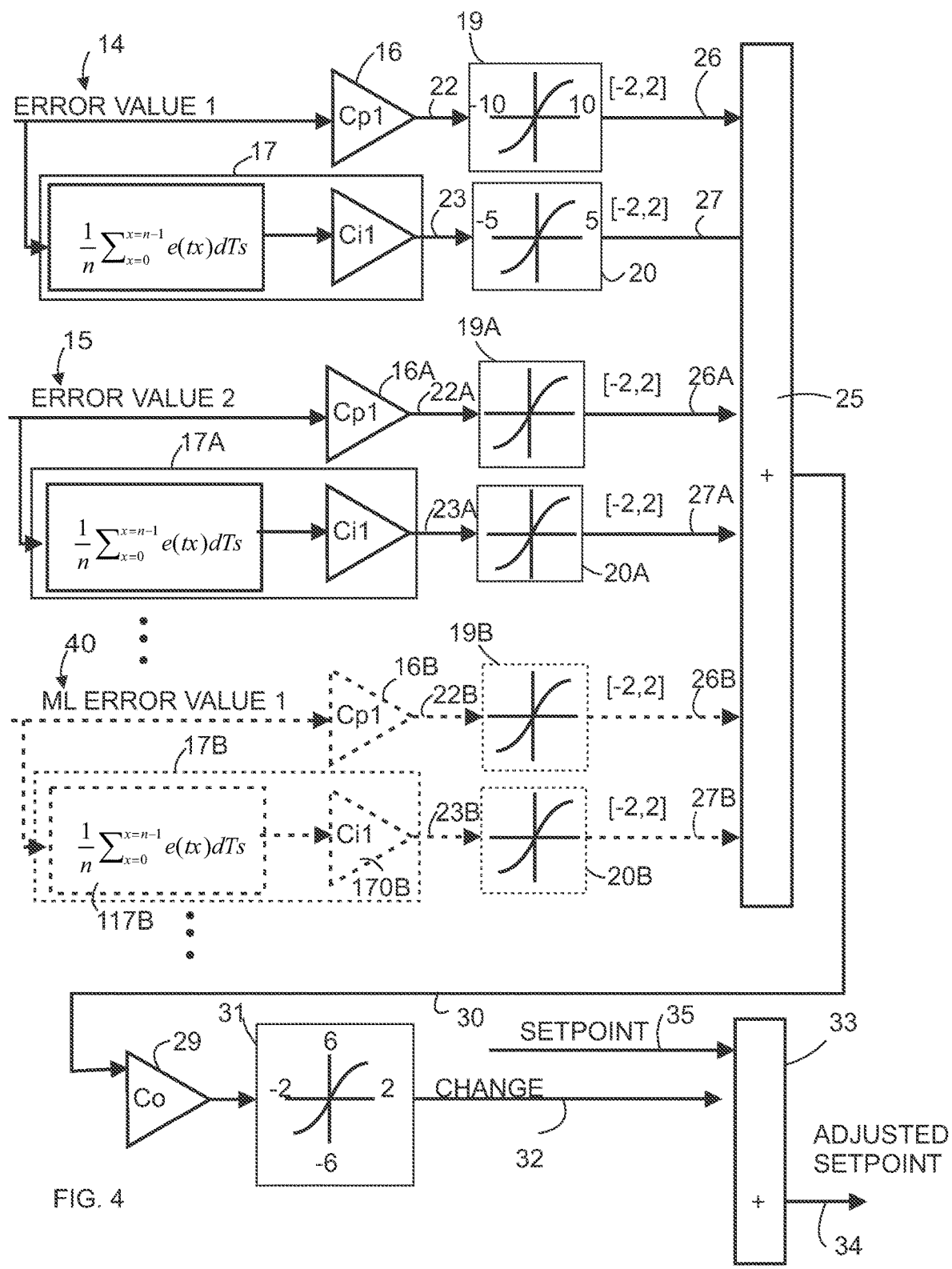
Figure 5:
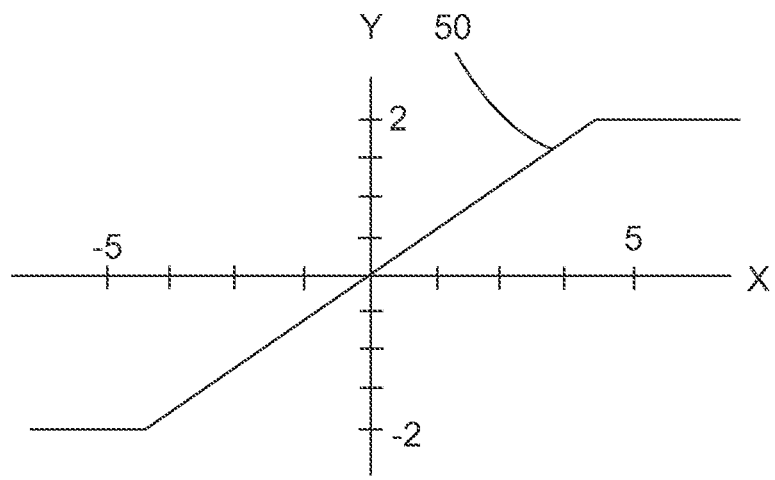
Figure 6:
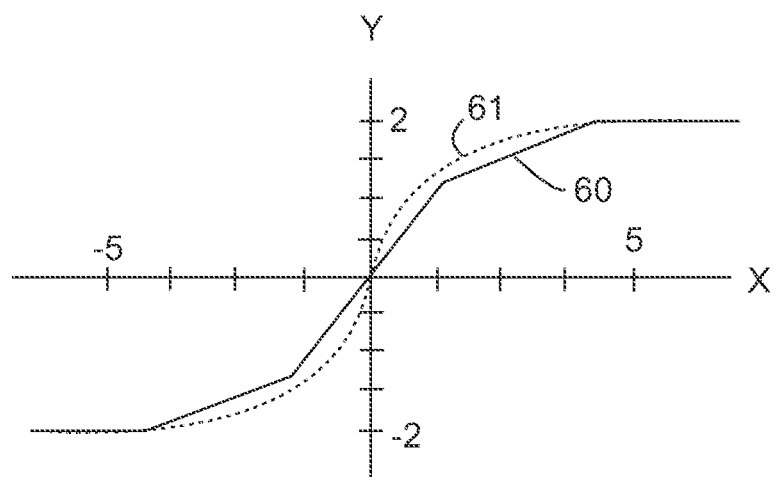
Figure 7:
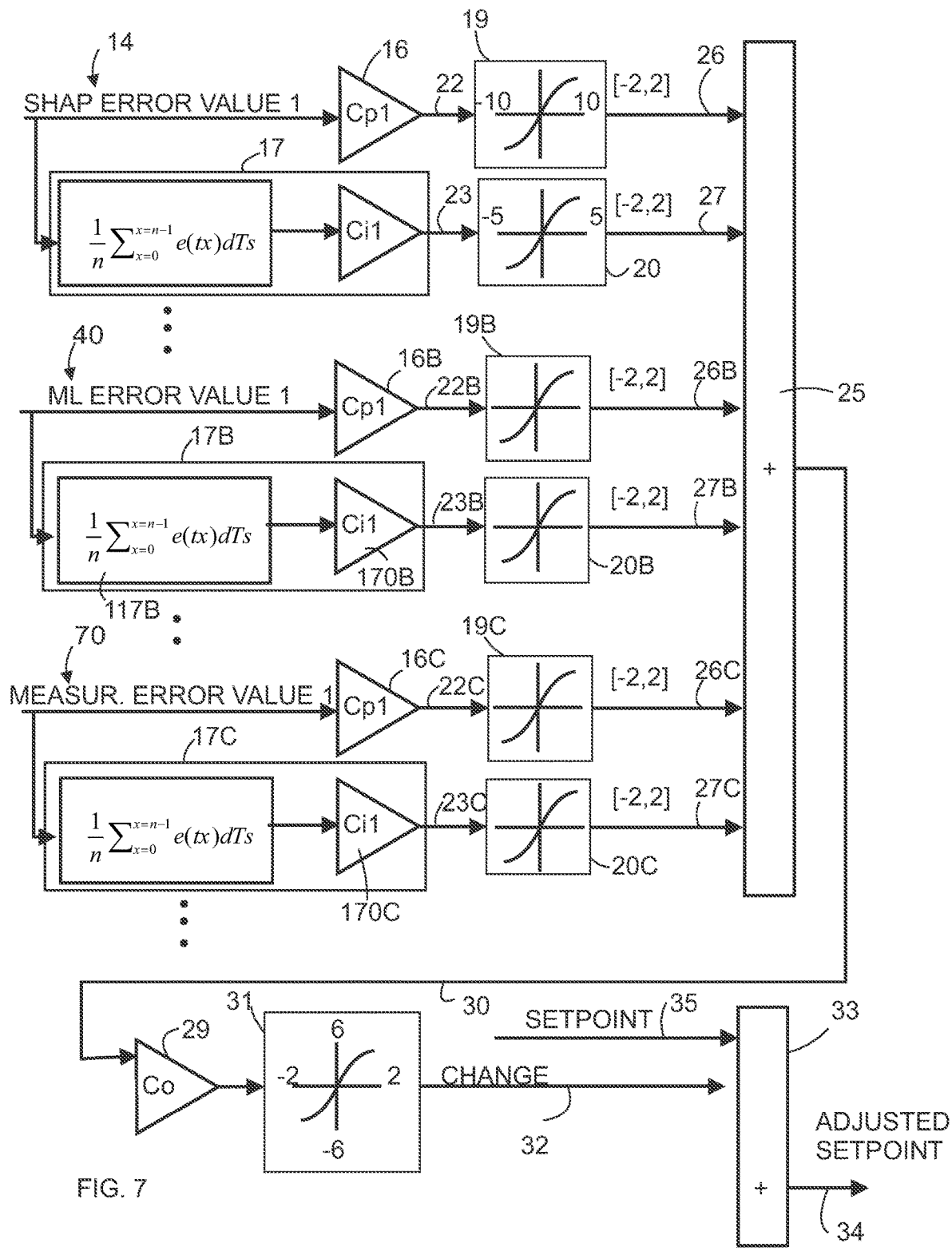

In the following, the invention is described in more detail by reference to the enclosed drawings, where FIG. 1 illustrates an example of a prior art control arrangement FIG. 2 illustrates an example of a control arrangement according to the invention, FIG. 3 illustrates an example of a setpoint controller according to the invention, FIG. 4 illustrates another example of a setpoint controller according to the invention, FIG. 5 illustrates an example of a LE or fuzzy mapping, FIG. 6 illustrates other examples of the LE or fuzzy mapping, and FIG. 7 illustrates yet another example of a setpoint controller according to the invention.

DESCRIPTION OF THE INVENTION

FIG. 2 illustrates an example of a control arrangement according to the invention. The control arrangement has a controller 3, which is arranged to drive an actuator 2. In addition, the control arrangement comprises a setpoint controller 11, which is arranged to utilize deviations 12 between explanation values 8 of machine learning 7 and normal explanation values 13 of machine learning. The setpoint controller 11 forms a setpoint value 11A for the controller. FIG. 2 illustrates also other possible embodiments wherein the deviation errors are not only based on explanations values but can include measurement data and/or ML algorithm predictions. In these other embodiments the normal value module 13 has also normal values of the measurement data and/or the normal values of the ML values, and the deviation calculation module 12 calculates all deviations used in the embodiment.

So, the setpoint controller 11 may utilize the deviations of the explanation values but in addition to these values the deviations of the measurement data and/or the deviations of the ML values can be used for forming the setpoint value. All these deviations may be obtained from good running periods of the process 1. As can be seen it is convenient to utilize the pre-processed measurement data, since at least some measurement noise and other defects can be filtered out.

The explanation values of machine learning and normal explanation values of machine learning are, for example, SHAP values, values from a LIME method, values from a DeepLIFT method or any other possible explanation values.

The LIME method interprets individual model predictions, which are based on locally approximation the model around a given prediction. LIME refers to simplified inputs x as interpretable inputs. The mapping $x=h_x(x)$ converts a binary vector of interpretable inputs into the original input space. Different types of $h_x$ mappings are used for different input spaces.

DeepLIFT is a recursive prediction explanation method. It attributes to each input $x_i$ a value $C_{\Delta xi \Delta y}$ that represents the effect of that input being set to a reference value as opposed to its original value. It means that DeepLIFT mapping $x=h_x(x)$ converts binary values into the original inputs, where 1 indicates that an input takes its original value, and 0 indicates that it takes the reference value. The reference value represents a typical uninformative background value for the feature.

The SHAP (SHapley Additive exPlanation) explanation values attribute to each feature the change in the expected model prediction when conditioning on that feature. The values explain how to get from a base value an expectation $E[f(z)]$ that is going to be predicted if we did not know any features to the current output $f(x)$. The order how features are added in the expectations matters. However, this is taken into account in SHAP values.

FIG. 2 shows also (like FIG. 1 as well) a process 1 driven by an actuator 2, which actuator is controlled by a controller 3. Measurements 4 are taken from the process and the controller compares the measurements with a setpoint value or values 11A, and forms a control command/s 3A for the actuator 2. The process may comprise several processes, so as whole it can be a combination of processes that run together.

As already described the measurements 4 can also be used for other purposes, and can be pre-processed 6. The pre-processing may, for example, comprise data merging, aligning time format, modifying metadata, data validation etc. In the example of FIG. 2 machine learning 7 is used for extracting information and patterns in large datasets. The recognised patterns can be obtained by building a mathematical model based on a training dataset. Predictions (simulations) and pattern recognition can be made by feeding new data to the mathematical model.

The explanation values 8, like SHAP values, are used to track how ML predictions link back to the input variables. For each prediction a rating number is calculated for each input variable indicating how the variable is contributing to the final predictions. These rating numbers are explanation values indicating the significance of an input value at a given point in time.

As can be noted, the deviation/error between the normal explanation values and the explanation values from the current ML prediction/estimation is calculated 12. The normal explanation values can be stored library values found from good running periods of the process. So, the normal explanation values have been derived from the good running periods of a process, which is controlled by the control arrangement. The normal values can, for example, be derived as simple or median values of these good periods. The normal operation of the process occurs in time-periods where the process or combined processes are running well. So, for all data (pre-processed, ML predictions and ML explanation values) normal (optimal) values can be given (from the stored values) or estimated. Therefore, there can be the library of normal historical values, where the process has been identified to run optimally.

So, differences, deviations or errors are detected from the measurements during operation periods where individual or combined processes are not running optimally. These is detected as divergence from the normal values. The differences 12A from the normal values 13 are used as input to the setpoint controller 11. Although, the deviation calculation module 12 is showed as a separate module, it is also possible that it belongs as a part to the setpoint controller 11. In general, the deviations relate to errors. The greatness of the error indicates the need of changing the setpoint or how much the setpoint should be changed.

FIG. 3 shows an example of the setpoint controller 11, which uses deviations/errors 12A (FIG. 2). The example of FIG. 3 shows two error values 14, 15 for two variables, but as illustrated more variables and error values can be used if needed. So at least one error/deviation value is useable in an inventive setpoint controller.

The setpoint controller comprises at least one P module 16, 16A, an I module 17, 17A, or a D module 18, 18A, or any combination of these modules. As said the deviations are input data into the modules. The setpoint controller comprises also input mapping module/s 19, 20, 21, 19A, 20A, 21A for each output 22, 23, 24, 22A, 23A, 24A of the module. Further, the setpoint controller comprises a summation module 25 to sum output/s 26, 27, 28, 26A, 27A, 28A of the input mapping module/s 19, 20, 21, 19A, 20A, 21A, and an output scaling module 29 to scale an output 30 of the summation module. Further the setpoint controller comprises an output mapping module 31 in order to provide a normalized output 32, and a setpoint adjusting module 33 utilizing the normalized output 32 in order to change the setpoint value. It is worth to mention that depending on the embodiment the output scaling module may give a positive or negative output, and the shape of the mapping curve of the module 30 determines change, i.e. the output 32. An output of the setpoint adjusting module 33 is an adjusted setpoint 34. The adjusted setpoint value is used as the setpoint 11A for the controller 3. The adjusted setpoint also replaces the previous setpoint value 35. As can be seen the setpoint adjusting module 33 comprises a second summation module in order to sum the normalized output 32 and an existing setpoint value 35.

The P, I and D modules 16, 16A, 17, 17A, 18A and their combinations PI, PD, ID and PID are known as such, but deviations/errors of explanation values have not been previously used as inputs. The P-module 16, 16A has a weighting coefficient, which is multiplied with the input error value. The I-module comprises an integrator unit 117, 117A, which integrates the input error values of a certain period. The integrated input error value is multiplied by the second weighting coefficient 170, 170A. The D-module comprises a differentiator unit 118, 118A which forms a derivate of the error values during a certain period. The derivate is multiplied by the third weighting coefficient 180, 180A. As can be seen the all P, I, and D modules and their combinations have a weighting coefficient unit. These units may have a same weighting coefficient or different weighting coefficients. The weighting coefficient makes it possible to weight the importance of the proportional (P), integral (I) and differential (D) part of the error value, and also to tune or fine tune the performance of the setpoint adjustment by increasing or decreasing the contribution from each single input calculation.

It is not always needed to have all P, I and D modules, but as said, they can be in the controller if they are really used and needed. In the embodiment of FIG. 3, the P, I, and D modules together provides a PID calculations for the error value 14 and the error value 15 and other possible values. Note that in another embodiment only one error value, like the error value 14, may be enough for achieving a good setpoint adjustment.

FIG. 4 shows another possible example wherein the D modules are not needed, so the setpoint controller of this example has PI calculations. As said the controller may have only those modules, which are required for P, I, D, PI, PD, ID or PID calculations of an embodiment of the setpoint controller. It also worth to mention that the setpoint controller may have different calculations for different error values. For example, the embodiment of FIG. 3 may be modified to another solution so that PID calculation is made for the error value 14, and the P calculation is made for the other error value 15 (i.e. the I module 17A and the D module 18A have been removed).

As described above the setpoint controller comprises also the input mapping modules 19, 20, 21, 19A, 20A, 21A for each output 22, 23, 24, 22A, 23A, 24A of the P, I and D modules. See FIG. 3. The input mapping translates the result of each output of the P, I or D module to a value between −2 and 2. This can be seen as normalization of the values. The inputs maps are formed from linguistic equations (LE) or from fuzzy logic. By using the input maps non-linearities can be taken into account conveniently. Tuning of the setpoint controller is also relatively smooth, since the properties of the process are taken into account inside the inputs maps. The mapping modules of the setpoint controller may utilize any mapping curve individually. For example in FIG. 3, the module 19 and 19A may have been formed from LE or one module 19 have been formed form LE and the other 19A from the fuzzy logic.

FIG. 4 shows also other possible embodiments. In addition to the deviation errors 14 based on the explanations values, the ML deviations 40 can be used. The deviations of the measurement data can also be used, but is not showed in FIG. 4. As can be noted in FIG. 4 for the ML deviations there can also be the P, I and D modules 16B, 17B, and their combinations PI, PD, ID and PID, which are required in the embodiment. The embodiment of FIG. 4 shows an example of the P module 16B, and the I module 17B (having the integrator unit 117B and the second weighting coefficient 170B), which have outputs 22B, 23B to the mapping modules 19B, 20B. These mapping modules have the outputs 26B, 27B to the summation module 25.

FIG. 7 shows a further example of an inventive embodiment. The embodiment of FIG. 7 utilizes the deviations 14 of the explanation values, like the SHAP values, and the deviations 40 of the ML values in a similar way as in the embodiment of FIG. 4. In addition the embodiment of FIG. 7 utilizes also the deviations 70 of the measurement data. Also for the measurement data deviations there can also be the P, I and D modules 16C, 17C, and their combinations PI, PD, ID and PID, which are required in the embodiment. The embodiment of FIG. 8 shows an example of the P module 16C, and the I module 17C (having the integrator unit 117C and the second weighting coefficient 170C), which have outputs 22C, 23C to the mapping modules 19C, 20C. These mapping modules have the outputs 26C, 27C to the summation module 25.

FIG. 5 shows an example of a mapping curve 50, which has formed from the linguistic equations or the fuzzy logic. X is an input variable, which is converted to an output variable Y. Maximum and minimum values are determined for X and Y. A linear formula (like $y=ax+b$) determines the Y values between X occurs between the maximum and minimum values. If X is greater than the maximum X value, Y is maximum Y. If X is smaller than the minimum X value, Y is minimum Y.

The mapping curve can also be another curve than the linear curve. It can be another curve, which matches better for the features of the process. FIG. 6 shows two other possible examples to the mapping curve. The solid line describes a piecewise linear mapping curve 60, and the dashed line an S-curve mapping 61. Other curves are possible as well. So, refereeing to FIG. 3, the mapping modules may utilize any mapping curve individually. For example, the module 19 and 19A may have the same mapping curve, like a linear curve, or different curves, like different linear curves, or a piecewise linear curve and a S-curve.

The outputs 26, 27, 28, 26A, 27A, 28A of the input mapping module/s 19, 20, 21, 19A, 20A, 21A, are summed in the summation module 25. So, all deviation/error values are taken into account. The sum output 30 is then scaled by the output scaling module 29, and the scaled sum is normalized by the output mapping module 31 in order to provide a normalized output 32. The normalized output is used by the setpoint adjusting module 33 in order to change the setpoint value.

In order to provide the inventive arrangement knowledge of the process to be controlled is useful. As said the process has often many variables that are measured. All measurements are usually not needed for controlling a certain property of the process, so measurement data that is used for a specific control are selected. Referring to FIGS. 3 and 4, the input and output scaling, i.e. the weighting coefficients, are selected as well as curve forms for the input mapping modules and the output mapping module. The parameters of P, I and D and the other possible modules are selected. All units/modules of the setpoint controller (P, I, D and their combinations, weighting coefficients, mapping modules, the summation modules) and the deviation calculation module 12, the data pre-processing module 6, the ML module 7 and explanation value module 8, can be performed as software or as special integrated circuits, or as combination of software and hardware. The module 13 having the normal values is a memory, which naturally can comprise software and hardware.

A method for controlling an industrial process according to the invention utilizes the control arrangement described in this text. So, the method can use the control arrangement for dosing of one or more of the chemicals used in the process. Further the process (like industrial process) to be controlled by the inventive method can be a pulp process, papermaking, board making or tissue making process, industrial water or waste water treatment process, raw water treatment process, water re-use process, municipal water or waste water treatment process, sludge treatment process, mining process, oil recovery process or any other industrial process.

As illustrated above the invention provides an automatic way to provide a setup input to the controller 3, which controls the process 1. Process can be an industrial process, for example pulp process, papermaking, board making or tissue making process, industrial water or waste water treatment process, raw water treatment process, water re-use process, municipal water or waste water treatment process, sludge treatment process, mining process, oil recovery process or any other industrial process.

The process can, for example, be a water treatment process or a paper making process. The process is usually multivariable process, so a great number of measurements are taken. In order to understand how a ML algorithm has arrived at a predicted value explanation values are formed to evaluate the input parameters. Having also the normal explanation values, which indicate that the process runs fine, the deviation/error values of the explanation values can be formed, and they can be used for providing the setpoint commands to the controller 3. In practice, there may be several different actuators 2 and controllers 3 in order to drive the process. Therefore, the inventive arrangement may comprise more than one controllers and setpoint controllers, and also deviation calculation modules. As illustrated in the examples above the inventive embodiment can utilize the deviations of the explanation values, the deviations of the ML values and/or the deviations of the measurement data.

The inventive arrangement can be located to the same place as the process that is followed. However, it is also possible that it is located partly to another place, which makes it possible to remotely control the process. For example, the measurement data 4 are sent through a communication network/s to the further processing according to the invention, where the measurement data are handled and a setpoint adjustment is send the controller 3.

It is evident from the above that the invention is not limited to the embodiments described in this text but can be implemented utilizing many other different embodiments within the scope of the independent claims.

The invention claimed is:

1. A control arrangement having a controller, which is arranged to drive an actuator in an industrial process, the control arrangement comprising a setpoint controller arranged to utilize deviations between explanation values of machine learning and normal explanation values of machine learning, the deviations being input data to the setpoint controller, the setpoint controller forming a setpoint value for the controller, wherein the explanation values of machine learning and normal explanation values of machine learning are SHAP values, values from a LIME method, values from a DeepLIFT method or any other possible explanation values, wherein the setpoint controller is also arranged to utilize deviations between machine learning values and normal machine learning values, and/or deviations between measurement data and normal measurement data, and wherein said normal values are values that have been derived from good running periods of a process, which is controlled by the control arrangement, wherein the setpoint controller comprises at least one P module, an I module, or a D module, or any combination of these modules, said deviations being input data into said modules, the setpoint controller comprising also input mapping module/s for each output of said module/s, a summation module to sum output/s of the input mapping module/s, an output scaling module to scale an output of the summation module, an output mapping module in order to provide a normalized output, and a setpoint adjusting module utilizing the normalized output in order to change the setpoint value.

2. The control arrangement according to claim 1, wherein the setpoint adjusting module comprises a second summation module in order to sum the normalized output and an existing setpoint value.

3. The control arrangement according to claim 1, wherein said mapping modules have been formed from linguistic equations or fuzzy logic.

4. The control arrangement according to claim 3, wherein mapping curves of the mapping modules provide a linear curve, piecewise linear, S-curve and/or another curve form.

5. The control arrangement according to claim 1, wherein the arrangement comprises a deviation calculation module to provide the said deviations.

6. The control arrangement according to claim 5, wherein the deviation calculation module is a part of the setpoint controller.

7. The control arrangement according to claim 5 wherein the deviation calculation module is a separate module from the setpoint controller.

8. The control arrangement according to claim 6, wherein the arrangement comprises more than one controller, setpoint controller, and deviation calculation module.

9. The control arrangement according to claim 1, wherein the industrial process is a pulp process, papermaking, board making or tissue making process, industrial water or waste water treatment process, raw water treatment process, water re-use process, municipal water or waste water treatment process, sludge treatment process, mining process, oil recovery process or any other industrial process.

10. A method for controlling an industrial process using a control arrangement, the method comprising:
   forming a setpoint value for a controller of the control arrangement by determining deviations between explanation values of machine learning and normal explanation values of machine learning from a setpoint controller, the deviations being input data to the setpoint controller, wherein the explanation values of machine learning and normal explanation values of machine learning are SHAP values, values from a LIME method, values from a DeepLIFT method or any other possible explanation values, wherein the setpoint controller comprises at least one P module, an I module, or a D module, or any combination of these modules, said deviations being input data into said modules, the setpoint controller comprising also input mapping module/s for each output of said module/s, a summation module to sum output/s of the input mapping module/s, an output scaling module to scale an output of the summation module, an output mapping module in order to provide a normalized output, and a setpoint adjusting module utilizing the normalized output in order to change the setpoint value;
   determining deviations between machine learning values and normal machine learning values, and/or deviation between measurement data and normal measurement data using the setpoint controller, wherein said normal values are values that have been derived from good running periods of a process that has been controlled by the control arrangement; and
   driving an actuator of the control arrangement.

11. The method according to claim 10, wherein the control arrangement is used to dosing of one or more of the chemicals used in the industrial process.

12. The method according to claim 10, wherein the industrial process is a pulp process, papermaking, board making or tissue making process, industrial water or waste water treatment process, raw water treatment process, water re-use process, municipal water or waste water treatment process, sludge treatment process, mining process, oil recovery process or any other industrial process.

* * * * *